(12) United States Patent
Rosam et al.

(10) Patent No.: US 9,758,312 B2
(45) Date of Patent: Sep. 12, 2017

(54) FEEDING DEVICE HAVING A DOUBLE-DISK FEED HAVING A SEPARATED DRIVE AND METHOD FOR OPERATING SUCH A FEEDING DEVICE

(71) Applicant: NETZSCH Pumpen & Systeme GmbH, Selb (DE)

(72) Inventors: Markus Rosam, Aschau am Inn (DE); Mikael Tekneyan, Waldkraiburg (DE); Hisham Kamal, Waldkraiburg (DE)

(73) Assignee: NETZSCH Pumpen & Systeme GmbH, Selb (DE)

( * ) Notice: Subject to any disclaimer, the term of this patent is extended or adjusted under 35 U.S.C. 154(b) by 923 days.

(21) Appl. No.: 14/028,012

(22) Filed: Sep. 16, 2013

(65) Prior Publication Data

US 2014/0014476 A1    Jan. 16, 2014

Related U.S. Application Data

(60) Division of application No. 13/356,928, filed on Jan. 24, 2012, now Pat. No. 9,550,631, which is a continuation of application No. PCT/DE2010/000556, filed on May 18, 2010.

(30) Foreign Application Priority Data

Jul. 24, 2009   (DE) .................... 20 2009 010 131 U

(51) Int. Cl.
*B65G 47/19*    (2006.01)
*B65D 88/68*    (2006.01)

(52) U.S. Cl.
CPC ............. *B65G 47/19* (2013.01); *B65D 88/68* (2013.01)

(58) Field of Classification Search
CPC ................................ B65G 47/19; B65D 88/68
USPC ... 222/1, 226, 227, 229, 236–242, 412, 413; 366/292–301
See application file for complete search history.

(56) References Cited

U.S. PATENT DOCUMENTS

| | | | |
|---|---|---|---|
| 1,755,674 A | 4/1930 | Taurianen | |
| 3,377,000 A | 4/1968 | Mason, Jr. | |
| 3,804,304 A | 4/1974 | Richter | |
| 4,382,404 A | 5/1983 | Hawley et al. | |
| 4,496,083 A | 1/1985 | Gericke et al. | |

(Continued)

FOREIGN PATENT DOCUMENTS

| | | |
|---|---|---|
| DE | 2813785 A1 | 10/1978 |
| DE | 3586241 T2 | 12/1992 |
| DE | 29808800 U1 | 9/1998 |

(Continued)

OTHER PUBLICATIONS

International Preliminary Report on Patentability and Written Opinion of the International Searching Authority; Application No. PCT/DE2010/000556; Issued: Feb. 7, 2012; 7 pages.

(Continued)

*Primary Examiner* — J. Casimer Jacyna
(74) *Attorney, Agent, or Firm* — Whitmyer IP Group LLC

(57) ABSTRACT

A feeding device for an in-line screw machine with a shaft rotating in a feed container. A conveying screw is arranged in the direction toward the longitudinal axis of the rotating shaft. At least one disk wheel is allocated to each longitudinal side in the feed container. A separate drive is allocated to each disk wheel for purposes of rotational movement.

22 Claims, 3 Drawing Sheets

(56) References Cited

U.S. PATENT DOCUMENTS 4,989,761 A * 2/1991 Ikeda .......................... 222/231
5,709,322 A   1/1998 Ricciardi

FOREIGN PATENT DOCUMENTS

DE   102008020411 B3   10/2009
EP       0185541 A1    6/1986
EP       1721728 A2   11/2006
GB       2098967 A     5/1982

OTHER PUBLICATIONS

International Search Report; Application No. PCT/DE2010/000556; Issued: Oct. 8, 2010; Mailing Date: Oct. 19, 2010; 3 pages.

* cited by examiner

FEEDING DEVICE HAVING A DOUBLE-DISK FEED HAVING A SEPARATED DRIVE AND METHOD FOR OPERATING SUCH A FEEDING DEVICE

FIELD OF THE INVENTION

The invention relates to feeding devices for in-line screw machines with a shaft rotating in a feed container. The shaft exhibits a screw-shaped transport means that conveys in the direction toward the longitudinal axis of the shaft, and is not mechanically linked with a feed aid.

BACKGROUND OF THE INVENTION

German patent specification DE 10 2008 020 41 B3 relates to a feeding device for in-line screw machines, in particular to avoid bridging in the medium to be conveyed. Generating unsymmetrical shear forces on opposing sides of the conveyor screw avoids the formation of textures in the medium that lead to bridging. This is realized by two disk wheels, which are driven by the conveyor screw. In addition, the disk wheels are equipped with strips that recirculate and/or loosen any material that might have dammed up in the feeding device.

Design patent DE 298 08 800 U1 discloses a feeding device for screw conveyors. In this configuration, the screw conveyor simultaneously serves as the drive for the catch element of the feeding device. The five depicted catch elements join together two wheels, the bearings of which are arranged on the same rotational axis. Since the catch elements engage into the screw flights, the feeding device rotates as soon as the conveyor screw operates. The advantage to this arrangement is that it requires no additional drive for the feeding device. However, there is little avoidance of the bridging expected to arise when conveying heavy conveying media.

The German translation DE 35 86 241 T2 of European patent specification EP 0 185 541 B1 describes a screw conveyor, in which two parallel, spaced apart conveyor screws rotate in a housing. To improve the way the product to be conveyed gets into or between the screw flights, draw-in rollers with wings are provided, arranged either one perpendicular or two parallel to the conveyor screws. The draw-in rollers with their movable wings that engage into the product are situated above the conveyor screws, and to the side of the latter in the dual configuration, and made to rotate independently of the conveyor screws of separate drives.

SUMMARY OF THE INVENTION

The object of the present invention is to provide a feeding device with which bridging can be avoided, in particular when conveying heavy conveying media.

The object of the invention is achieved with the features in the independent claim, wherein advantageous features to avoid bridging may be gleaned from the subclaims.

The object of the invention is further to create a method with which a feeding device for heavy conveying media can be smoothly and economically operated.

This object is achieved by a method for operating the feeding device, characterized by the following points: each disk wheel is separately powered; the disk wheels move and/or loosen a compacted conveying medium in the feed container; and the disk wheels are rotated against or in the conveying direction of a screw.

The feeding device for in-line screw machines according to the invention is provided with a shaft that rotates in a feed container. A conveyor screw is arranged in the direction toward the longitudinal axis of the rotating shaft. At least one disk wheel is allocated to the feed container on each longitudinal side, wherein each disk wheel is equipped with a separate drive. In order to prevent bridging of compacted conveying media in the feed container, the disk wheels can rotate.

In order to again release the compacted conveying medium between the disk wheels, the two opposing disk wheels are operated at varying speeds. This difference in speed produces a shearing action while recirculating the conveying medium located between the disk wheels. This loosens the compacted material during recirculation.

The opposing sides of the disk wheels are provided with a structured surface. In another preferred embodiment, both sides of the disk wheel exhibit structured surfaces. Imparting a structured surface to both sides of the disk wheels allows both sides to be used. If the structured surface of one side of the disk wheel is worn, the disk wheel can be turned and used from the other side. This configuration makes it possible to save on disk material, and reduce storage costs for replacement disk wheels.

The structured surface of the disk wheels makes it possible to transport the compacted conveying medium in the feed container. The compacted conveying medium is lifted between the disk wheels, and released again at a defined point in the feed container. Transport takes place as a result of the interaction between the conveying medium and disk wheels caused by the structured surface.

Depending on the configuration of the in-line screw machines, it may be necessary to arrange several disk wheels on each longitudinal side of the feed container. In addition, the disk wheels can be offset in the longitudinal direction relative to the axial longitudinal axis of the rotating shaft. Offsetting the disk wheels in this way causes the disk wheels to move synchronously to each other only within a specific range, and release the compacted conveying medium at locations where there is no overlap.

The disk wheels can be rotated in or against the conveying direction of the screw. In order to destroy compacted conveying medium bridges without transporting the conveying media in the feed container, the disk wheels can be powered in opposite directions.

The disk wheels are connected with an axis by means of at least two spokes. The disk wheels can each be powered by a separate drive via the axis. In addition, the spokes of the disk wheels are also provided with a structured surface.

The method according to the invention for operating a feeding device is based on separately powering each disk wheel. The compacted conveying medium in the feed container is transported or recirculated via a structured surface of the disk wheels. This avoids bridging and/or destroys existing bridges. The disk wheels are rotated in or against the conveying direction of a screw. Release of the compacted conveying medium is assisted by the difference in speeds of the two opposing disk wheels. In another embodiment, the disk wheels are powered in opposite directions, so that bridging in the feed container can be avoided. In addition, the basic speed and differential speed can be adjusted to the special requirements of the respective conveying medium.

Exemplary embodiments of the invention and their advantages will be described in greater detail below based on the attached figures. The dimensional ratios between the individual elements on the figures do not always correspond to the actual dimensional ratios, since several shapes are sim-

DETAILED DESCRIPTION OF THE INVENTION

The same reference numbers are used for elements of the invention that are identical or have an identical effect. In addition, for the sake of clarity, the individual figures present only reference numbers required for describing the respective figure.

Figure 1:
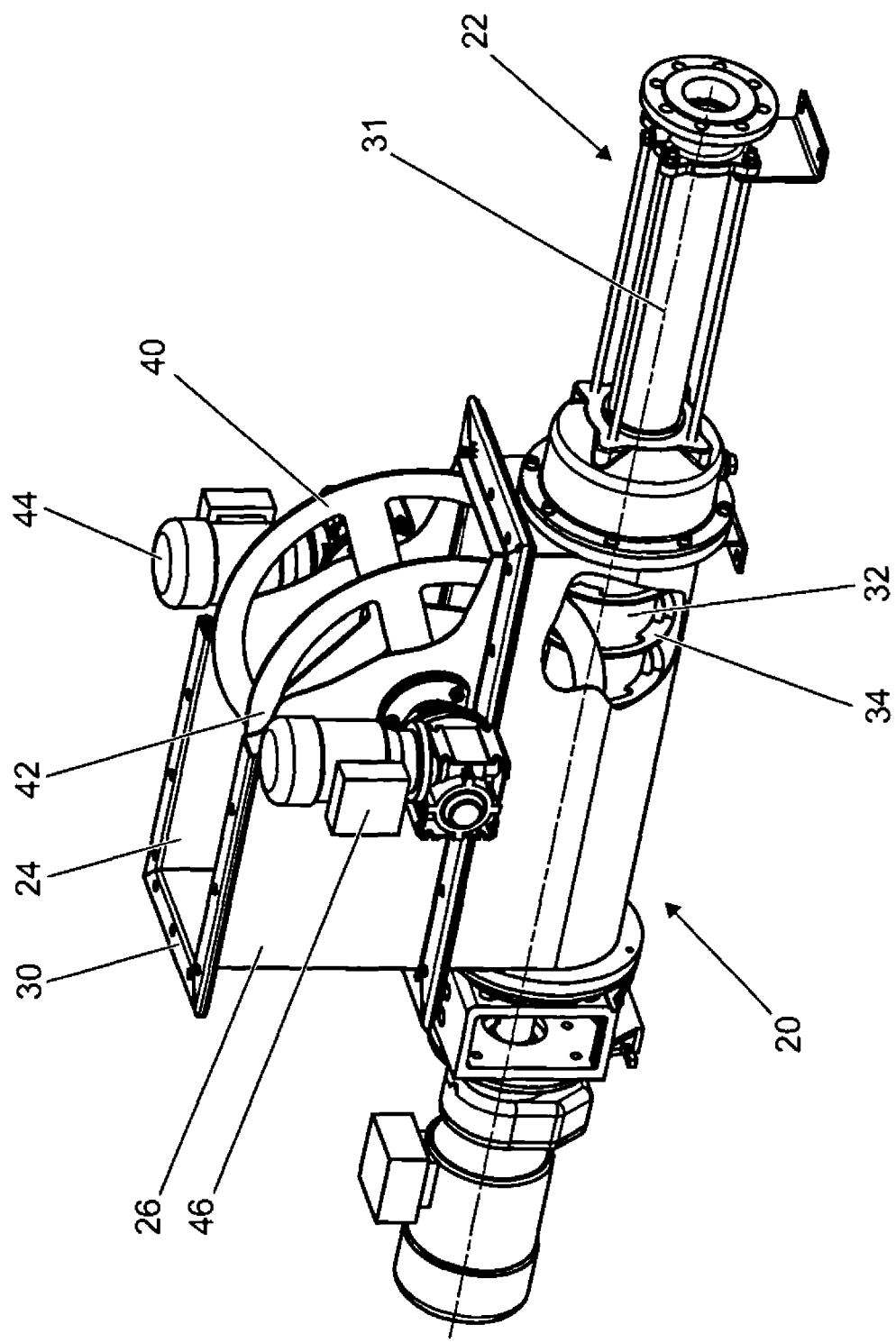
FIG. 1 shows a diagrammatic view of the structural design of the feeding device according to the invention.

FIG. 1 shows a diagrammatic view of the structural design of the feeding device 20 according to the invention. The first disk wheel 40 and second disk wheel 42 are situated inside the feed container 30 on the longitudinal sides 24 and 26. A first drive 44 is allocated to the first disk wheel 40, and a second drive 46 is allocated to the second disk wheel 42. As a result of the two drives 44 and 46, the two disk wheels 40 and 42 are independent of each other, and can be powered so as to separately rotate. An in-line screw machine 22 is arranged in the longitudinal direction of the feed container 30. Situated inside the in-line screw machine 22 is a shaft 32, on which a conveyor screw 34 is secured. The shaft 32 runs along a longitudinal axis 31.

Figure 2:
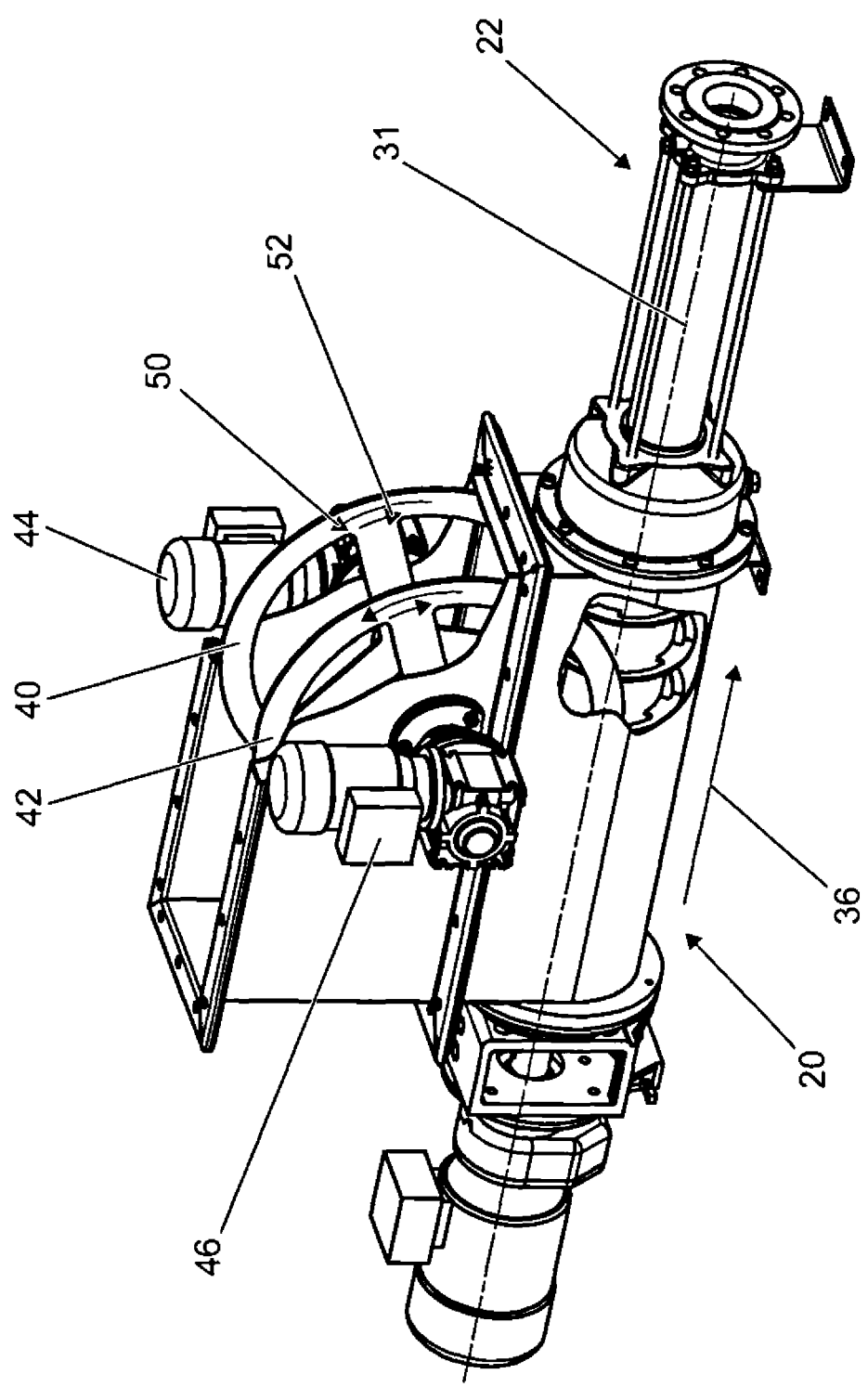
FIG. 2 shows different directions of movement for the disk motors.

FIG. 2 shows different directions of movement 50 and 52 for the disk wheels 40 and 42 by way of rotational direction arrows. The conveying direction 36 of the in-line screw machine 22 also runs along the longitudinal axis 31. The disk wheels 40 and 42 can be moved in a first direction of movement 50 in the conveying direction 36, or in a second direction of movement 52 against the conveying direction 36. In addition, it is conceivable to rotate the first disk wheel 40 in the first direction of movement 50 and the second disk wheel 42 in the second direction of movement 52, for example.

Figure 3:
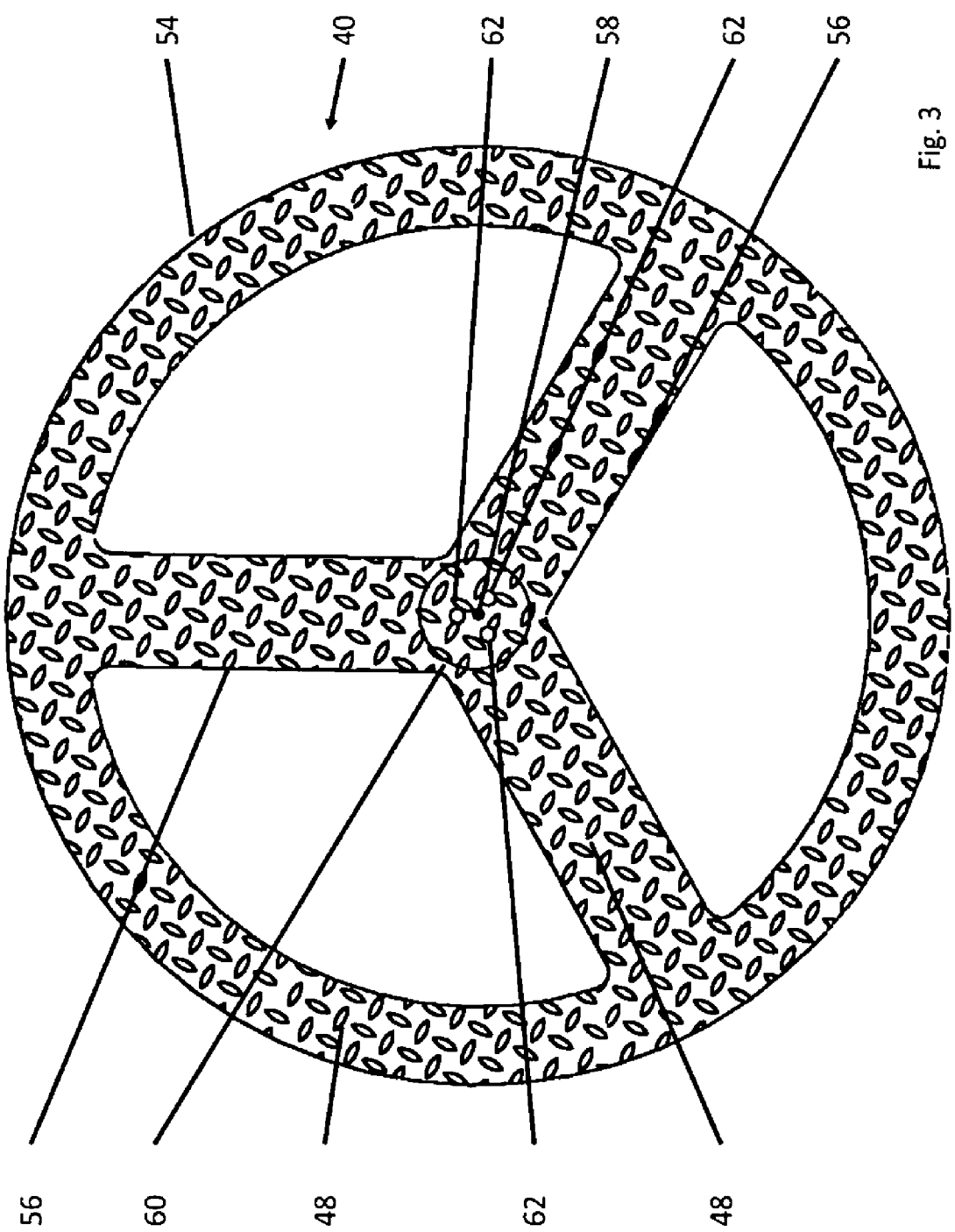
FIG. 3 shows the diagrammatic structural design of a disk wheel with structured surface in a preferred embodiment.

FIG. 3 shows the diagrammatic structural design of a disk wheel 40 with structured surface 48 in a preferred embodiment. The disk wheel 40 consists of a disk rim 54 and several spokes 56. The spokes 56 run outwardly from one axis 58 toward the disk rim 56. The disk wheel 40 is connected with a shaft 60 by several attachment points 62. This shaft 60 runs along the axis 58. The disk rim 56 and/or spokes 56 are provided with a structured surface 48. Each disk wheel 40 is radially moved by a separate drive (not shown) via the axis 58.

The invention was described with reference to a preferred embodiment. However, an expert can conceivably modify or change the invention without departing from the protective scope of the following claims.

What is claimed is:

1. A feeding device for in-line screw machines with a shaft that rotates in a feed container and exhibits a screw that conveys in the direction toward the longitudinal axis of the rotating shaft, a first disk wheel is allocated to a first longitudinal side in the feed container, a second disk wheel is allocated to a second longitudinal side in the feed container, characterized in that the first disk wheel is rotated by a first drive, the second disk wheel is rotated by a second drive separate from the first drive, the first drive and second drive are separate from the shaft that rotates in the feed container and exhibits the screw that conveys in the direction toward the longitudinal axis of the rotating shaft, and the first disk wheel and the second disk wheel are-separately powered by first drive and second drive, respectively.

2. The feeding device according to claim 1, characterized in that the disk wheels can be moved at different speeds.

3. The feeding device according to claim 1, characterized in that the opposing sides of the disk wheels are provided with a structured surface.

4. The feeding device according to claim 3, characterized in that both sides of the disk wheels are provided with a structured surface.

5. The feeding device according to claim 1, characterized in that the disk wheels can move and/or loosen a compacted conveying medium in the feed container.

6. The feeding device according to claim 1, characterized in that several disk wheels are arranged on each longitudinal side.

7. The feeding device according to claim 1, characterized in that the disk wheels are offset axially to the longitudinal axis of the rotating shaft.

8. The feeding device according to claim 1, characterized in that the disk wheels can be rotated against or in the conveying direction of the screw.

9. The feeding device according to claim 1, characterized in that the disk wheels can be powered in opposite directions.

10. The feeding device according to claim 1, characterized in that the disk wheels are connected with an axis by means of at least two spokes.

11. The feeding device according to claim 10, characterized in that the spokes are provided with a structured surface.

12. A feeding device for in-line screw machines with a shaft that rotates in a feed container and exhibits a screw that conveys in the direction toward the longitudinal axis of the rotating shaft, a first disk wheel is allocated to a first longitudinal side in the feed container, a second disk wheel is allocated to a second longitudinal side in the feed container, characterized in that the first disk wheel is rotated by a first motor, the second disk wheel is rotated by a second motor separate from the first motor, the first motor and second motor are separate from the shaft that rotates in the feed container and exhibits the screw that conveys in the direction toward the longitudinal axis of the rotating shaft, and the first disk wheel and the second disk wheel are-separately powered by first motor and second motor, respectively.

13. The feeding device according to claim 12, characterized in that the disk wheels can be moved at different speeds.

14. The feeding device according to claim 12, characterized in that the opposing sides of the disk wheels are provided with a structured surface.

15. The feeding device according to claim 14, characterized in that both sides of the disk wheels are provided with a structured surface.

16. The feeding device according to claim 12, characterized in that the disk wheels can move and/or loosen a compacted conveying medium in the feed container.

17. The feeding device according to claim 12, characterized in that several disk wheels are arranged on each longitudinal side.

18. The feeding device according to claim 12, characterized in that the disk wheels are offset axially to the longitudinal axis of the rotating shaft.

19. The feeding device according to claim 12, characterized in that the disk wheels can be rotated against or in the conveying direction of the screw.

20. The feeding device according to claim 12, characterized in that the disk wheels can be powered in opposite directions.

21. The feeding device according to claim 12, characterized in that the disk wheels are connected with an axis by means of at least two spokes.

22. The feeding device according to claim 21, characterized in that the spokes are provided with a structured surface.

\* \* \* \* \*